United States Patent
Johnsen et al.

(10) Patent No.: US 9,930,018 B2
(45) Date of Patent: Mar. 27, 2018

(54) SYSTEM AND METHOD FOR PROVIDING SOURCE ID SPOOF PROTECTION IN AN INFINIBAND (IB) NETWORK

(75) Inventors: Bjorn-Dag Johnsen, Oslo (NO); Line Holen, Fetsund (NO); David Brean, Boston, MA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 655 days.

(21) Appl. No.: 13/488,113

(22) Filed: Jun. 4, 2012

(65) Prior Publication Data
US 2012/0311670 A1    Dec. 6, 2012

Related U.S. Application Data

(60) Provisional application No. 61/493,330, filed on Jun. 3, 2011.

(51) Int. Cl.
| | |
|---|---|
| *H04L 29/06* | (2006.01) |
| *H04L 12/931* | (2013.01) |
| *H04L 12/24* | (2006.01) |
| *H04L 9/32* | (2006.01) |

(52) U.S. Cl.
CPC ........ *H04L 63/0442* (2013.01); *H04L 9/3234* (2013.01); *H04L 9/3271* (2013.01); *H04L 41/12* (2013.01); *H04L 49/20* (2013.01); *H04L 63/083* (2013.01); *H04L 63/0876* (2013.01)

(58) Field of Classification Search
CPC ............. H04L 63/0442; H04L 63/0876; H04L 63/083
See application file for complete search history.

(56) References Cited

U.S. PATENT DOCUMENTS

| | | | |
|---|---|---|---|
| 5,805,805 | A | 9/1998 | Civanlar et al. |
| 5,964,837 | A | 10/1999 | Chao et al. |
| 6,014,669 | A | 1/2000 | Slaughter |
| 6,091,706 | A | 7/2000 | Shaffer |
| 6,202,067 | B1 | 3/2001 | Blood |
| 6,463,470 | B1 | 10/2002 | Mohaban et al. |

(Continued)

FOREIGN PATENT DOCUMENTS

| | | |
|---|---|---|
| CN | 1567827 | 1/2005 |
| CN | 1728664 | 2/2006 |

(Continued)

OTHER PUBLICATIONS

V. Kashyap, RFC 4392: IP over Infiniband Architecture, Apr. 2006 p. 1-22.*

(Continued)

*Primary Examiner* — Jeffrey Nickerson
*Assistant Examiner* — Joseph M Cousins
(74) *Attorney, Agent, or Firm* — Tucker Ellis LLP (57) ABSTRACT

A system and method can provide source ID spoof protection in an InfiniBand (IB) fabric. The IB fabric can support a plurality of tenants in a subnet that connects a plurality of physical servers, wherein the plurality of tenants are associated with different partitions in the subnet. Then, the plurality of tenants can use at least one shared service, and the IB fabric can be configured to determine what ID values are legal for different physical servers and different partitions.

15 Claims, 4 Drawing Sheets

(56) References Cited

U.S. PATENT DOCUMENTS

| | | |
|---|---|---|
| 6,594,759 B1 | 7/2003 | Wang |
| 6,647,419 B1 | 11/2003 | Mogul |
| 6,678,835 B1 | 1/2004 | Shah et al. |
| 6,748,429 B1 | 6/2004 | Talluri et al. |
| 6,829,685 B2 | 12/2004 | Neal et al. |
| 6,904,545 B1 | 6/2005 | Erimli et al. |
| 6,941,350 B1 | 9/2005 | Frazier et al. |
| 6,963,932 B2 | 11/2005 | Bhat |
| 6,978,300 B1 | 12/2005 | Beukema et al. |
| 6,981,025 B1 | 12/2005 | Frazier et al. |
| 6,985,956 B2 | 1/2006 | Luke et al. |
| 7,023,811 B2 | 4/2006 | Pinto |
| 7,069,468 B1 | 6/2006 | Olson |
| 7,113,995 B1 | 9/2006 | Beukema et al. |
| 7,185,025 B2 | 2/2007 | Rosenstock et al. |
| 7,194,540 B2 | 3/2007 | Aggarwal et al. |
| 7,200,704 B2 | 4/2007 | Njoku et al. |
| 7,216,163 B2 | 5/2007 | Sinn |
| 7,221,676 B2 | 5/2007 | Green |
| 7,231,518 B1 | 6/2007 | Bakke |
| 7,290,277 B1 | 10/2007 | Chou et al. |
| 7,302,484 B1 | 11/2007 | Stapp et al. |
| 7,356,841 B2 | 4/2008 | Wilson et al. |
| 7,398,394 B1 | 7/2008 | Johnsen et al. |
| 7,409,432 B1 | 8/2008 | Recio et al. |
| 7,437,447 B2 | 10/2008 | Brey et al. |
| 7,493,409 B2 | 2/2009 | Craddock et al. |
| 7,500,236 B2 | 3/2009 | Janzen |
| 7,633,955 B1 | 12/2009 | Saraiya et al. |
| 7,634,608 B2 | 12/2009 | Droux |
| 7,636,772 B1 | 12/2009 | Kirby |
| 7,653,668 B1 | 1/2010 | Shelat |
| 7,685,385 B1 | 3/2010 | Choudhary et al. |
| 7,724,748 B2 | 5/2010 | Davis |
| 7,783,788 B1 | 8/2010 | Quinn et al. |
| 7,843,822 B1 | 11/2010 | Paul et al. |
| 7,853,565 B1 | 12/2010 | Liskov |
| 7,860,961 B1 | 12/2010 | Finkelstein et al. |
| 7,873,711 B2 | 1/2011 | Adams et al. |
| 7,953,890 B1 | 5/2011 | Katkar |
| 8,184,555 B1 | 5/2012 | Mouton et al. |
| 8,214,558 B1 | 7/2012 | Sokolov |
| 8,214,653 B1 | 7/2012 | Marr |
| 8,234,407 B2 | 7/2012 | Sugumar |
| 8,327,437 B2 | 12/2012 | McAlister |
| 8,331,381 B2 | 12/2012 | Brown et al. |
| 8,335,915 B2 | 12/2012 | Plotkin et al. |
| 8,423,780 B2 | 4/2013 | Plotkin et al. |
| 8,549,281 B2 | 10/2013 | Samovskiy et al. |
| 8,583,921 B1 | 11/2013 | Shu |
| 8,635,318 B1 | 1/2014 | Shankar |
| 8,739,273 B2 | 5/2014 | Johnsen |
| 8,769,152 B2 | 7/2014 | Gentieu |
| 8,924,952 B1 | 12/2014 | Hou |
| 8,935,206 B2 | 1/2015 | Aguilera |
| 8,935,333 B2 | 1/2015 | Beukema |
| 8,972,966 B2 | 3/2015 | Kelso |
| 2002/0059597 A1 | 5/2002 | Kikinis et al. |
| 2002/0120720 A1 | 8/2002 | Moir |
| 2002/0143914 A1 | 10/2002 | Cihula |
| 2002/0188711 A1 | 12/2002 | Meyer et al. |
| 2002/0198755 A1 | 12/2002 | Birkner |
| 2003/0009487 A1 | 1/2003 | Prabakaran et al. |
| 2003/0009551 A1 | 1/2003 | Benfield et al. |
| 2003/0033427 A1 | 2/2003 | Brahmaroutu |
| 2003/0079040 A1 | 4/2003 | Jain et al. |
| 2003/0093509 A1 | 5/2003 | Li et al. |
| 2003/0105903 A1 | 6/2003 | Garnett et al. |
| 2003/0115276 A1 | 6/2003 | Flaherty |
| 2003/0120852 A1 | 6/2003 | McConnell et al. |
| 2003/0208572 A1 | 11/2003 | Shah et al. |
| 2004/0022245 A1 | 2/2004 | Forbes et al. |
| 2004/0031052 A1 | 2/2004 | Wannamaker |
| 2004/0068501 A1 | 4/2004 | McGoveran |
| 2004/0090925 A1 | 5/2004 | Schoeberl |
| 2004/0139083 A1 | 7/2004 | Hahn |
| 2004/0153849 A1 | 8/2004 | Tucker et al. |
| 2004/0162973 A1 | 8/2004 | Rothman |
| 2004/0193768 A1 | 9/2004 | Carnevale |
| 2004/0199764 A1 | 10/2004 | Koechling et al. |
| 2004/0220947 A1 | 11/2004 | Aman et al. |
| 2004/0249928 A1 | 12/2004 | Jacobs et al. |
| 2004/0255286 A1 | 12/2004 | Rothman |
| 2005/0025520 A1 | 2/2005 | Murakami |
| 2005/0044363 A1 | 2/2005 | Zimmer et al. |
| 2005/0071382 A1 | 3/2005 | Rosenstock |
| 2005/0071709 A1 | 3/2005 | Rosenstock et al. |
| 2005/0086342 A1 | 4/2005 | Burt et al. |
| 2005/0091396 A1 | 4/2005 | Nilakantan et al. |
| 2005/0105554 A1 | 5/2005 | Kagan et al. |
| 2005/0125520 A1 | 6/2005 | Hanson et al. |
| 2005/0182701 A1 | 8/2005 | Cheston |
| 2005/0182831 A1 | 8/2005 | Uchida et al. |
| 2005/0182853 A1 | 8/2005 | Lewites et al. |
| 2005/0198164 A1 | 9/2005 | Moore et al. |
| 2005/0198250 A1 | 9/2005 | Wang |
| 2005/0213608 A1 | 9/2005 | Modi |
| 2005/0273641 A1 | 12/2005 | Sandven et al. |
| 2006/0079278 A1 | 4/2006 | Ferguson et al. |
| 2006/0112297 A1 | 5/2006 | Davidson |
| 2006/0114863 A1 | 6/2006 | Sanzgiri |
| 2006/0117103 A1* | 6/2006 | Brey et al. ............ 709/225 |
| 2006/0168192 A1 | 7/2006 | Sharma |
| 2006/0177103 A1 | 8/2006 | Hildreth |
| 2006/0195560 A1 | 8/2006 | Newport |
| 2006/0221975 A1 | 10/2006 | Lo et al. |
| 2006/0233168 A1 | 10/2006 | Lewites et al. |
| 2007/0016694 A1 | 1/2007 | Achler |
| 2007/0050763 A1 | 3/2007 | Kagan |
| 2007/0110245 A1* | 5/2007 | Sood et al. ............ 380/270 |
| 2007/0129917 A1 | 6/2007 | Blevins |
| 2007/0195774 A1* | 8/2007 | Sherman ............ H04L 49/3009 370/392 |
| 2007/0195794 A1 | 8/2007 | Fujita et al. |
| 2007/0206735 A1 | 9/2007 | Silver et al. |
| 2007/0253328 A1 | 11/2007 | Harper et al. |
| 2008/0031266 A1 | 2/2008 | Tallet et al. |
| 2008/0144614 A1 | 6/2008 | Fisher et al. |
| 2008/0159277 A1 | 7/2008 | Vobbilisetty et al. |
| 2008/0183853 A1 | 7/2008 | Manion et al. |
| 2008/0184332 A1 | 7/2008 | Gerkis |
| 2008/0192750 A1* | 8/2008 | Ko et al. ............ 370/395.3 |
| 2008/0201486 A1 | 8/2008 | Hsu et al. |
| 2008/0209018 A1 | 8/2008 | Hernandez et al. |
| 2008/0229096 A1 | 9/2008 | Alroy et al. |
| 2008/0250125 A1 | 10/2008 | Brey et al. |
| 2008/0288646 A1 | 11/2008 | Hasha |
| 2008/0310421 A1 | 12/2008 | Teisberg |
| 2008/0310422 A1 | 12/2008 | Booth et al. |
| 2009/0049164 A1 | 2/2009 | Mizuno |
| 2009/0116404 A1 | 5/2009 | Mahop et al. |
| 2009/0178033 A1 | 7/2009 | Challener |
| 2009/0216853 A1 | 8/2009 | Burrow et al. |
| 2009/0249472 A1 | 10/2009 | Litvin et al. |
| 2009/0271472 A1 | 10/2009 | Scheifler |
| 2009/0307499 A1 | 12/2009 | Senda |
| 2009/0327462 A1 | 12/2009 | Adams et al. |
| 2010/0014526 A1 | 1/2010 | Chavan |
| 2010/0020806 A1 | 1/2010 | Vahdat |
| 2010/0080117 A1 | 4/2010 | Coronado et al. |
| 2010/0082853 A1 | 4/2010 | Block et al. |
| 2010/0114826 A1 | 5/2010 | Voutilainen |
| 2010/0138532 A1 | 6/2010 | Glaeser et al. |
| 2010/0142544 A1 | 6/2010 | Chapel et al. |
| 2010/0166167 A1 | 7/2010 | Karimi-Cherkandi et al. |
| 2010/0235488 A1 | 9/2010 | Sharma et al. |
| 2010/0268857 A1 | 10/2010 | Bauman et al. |
| 2010/0306772 A1 | 12/2010 | Arnold et al. |
| 2011/0022574 A1 | 1/2011 | Hansen |
| 2011/0072206 A1 | 3/2011 | Ross et al. |
| 2011/0110366 A1 | 5/2011 | Moore et al. |
| 2011/0138082 A1 | 6/2011 | Khatri |
| 2011/0138185 A1 | 6/2011 | Ju et al. |
| 2011/0173302 A1 | 7/2011 | Rider |

(56) References Cited

U.S. PATENT DOCUMENTS

| | | |
|---|---|---|
| 2011/0179195 A1 | 7/2011 | O'Mullan |
| 2011/0209202 A1 | 8/2011 | Otranen |
| 2011/0222492 A1 | 9/2011 | Borsella et al. |
| 2011/0264577 A1 | 10/2011 | Winbom et al. |
| 2011/0283017 A1* | 11/2011 | Alkhatib ............. H04L 12/4641 709/244 |
| 2011/0307886 A1 | 12/2011 | Thanga |
| 2012/0005480 A1 | 1/2012 | Batke et al. |
| 2012/0039331 A1 | 2/2012 | Astigarraga et al. |
| 2012/0195417 A1 | 8/2012 | Hua et al. |
| 2012/0239928 A1 | 9/2012 | Judell |
| 2012/0290698 A1 | 11/2012 | Alroy et al. |
| 2012/0311333 A1 | 12/2012 | Johnsen |
| 2013/0041969 A1 | 2/2013 | Falco et al. |
| 2013/0046904 A1 | 2/2013 | Hilland |
| 2013/0159865 A1 | 6/2013 | Smith et al. |
| 2013/0179870 A1 | 7/2013 | Kelso |
| 2013/0191622 A1 | 7/2013 | Sasaki |
| 2013/0227561 A1 | 8/2013 | Walsh |
| 2013/0298183 A1 | 11/2013 | McGrath |
| 2013/0318341 A1 | 11/2013 | Bagepalli |
| 2013/0332982 A1 | 12/2013 | Rao |
| 2014/0068258 A1 | 3/2014 | Chao |
| 2014/0095853 A1 | 4/2014 | Sarangshar |
| 2014/0095876 A1 | 4/2014 | Smith et al. |
| 2014/0289792 A1 | 9/2014 | Fry |
| 2014/0317716 A1 | 10/2014 | Chao |
| 2014/0344436 A1 | 11/2014 | Madani |
| 2014/0351423 A1 | 11/2014 | Madani |
| 2014/0351920 A1 | 11/2014 | Madani |
| 2014/0351921 A1 | 11/2014 | Madani |
| 2014/0351922 A1 | 11/2014 | Madani |
| 2014/0351923 A1 | 11/2014 | Madani |
| 2015/0012962 A1 | 1/2015 | Walsh |
| 2015/0026332 A1 | 1/2015 | Madani |
| 2015/0066759 A1 | 3/2015 | Madani |
| 2015/0067020 A1 | 3/2015 | Makhervaks |
| 2015/0067789 A1 | 3/2015 | Madani |
| 2015/0067809 A1 | 3/2015 | Madani |
| 2015/0244817 A1 | 8/2015 | Johnsen |
| 2015/0358349 A1 | 12/2015 | Holden |
| 2015/0363219 A1 | 12/2015 | Kasturi |
| 2015/0381576 A1 | 12/2015 | Bosko |
| 2016/0036920 A1 | 2/2016 | Sama |
| 2016/0285917 A1 | 9/2016 | Fry |
| 2017/0170988 A1 | 6/2017 | Mazarick |

FOREIGN PATENT DOCUMENTS

| | | |
|---|---|---|
| EP | 2 051 436 A1 | 4/2009 |
| EP | 2160068 A1 | 3/2010 |
| JP | 2002247089 | 8/2002 |
| JP | 2004166263 | 6/2004 |
| JP | 2005522774 | 7/2005 |
| JP | 2006157285 | 6/2006 |
| JP | 2007501563 | 1/2007 |
| JP | 200854214 | 3/2008 |
| JP | 2009510953 | 3/2009 |
| WO | 01/90838 A2 | 11/2001 |
| WO | 2006016698 | 2/2006 |
| WO | 2008099479 | 8/2008 |
| WO | 2012037518 | 3/2012 |

OTHER PUBLICATIONS

Tom Shanley et al., Infiniband Network Architecture, Pearson Education, published Oct. 2002 p. 206-208,403-406.*
Tom Shanley et al. Infiniband Network Architecture, Pearson Education, published Oct. 2002 p. 117-123, 629-633.*
International Search Report dated Sep. 23, 2013 for Application No. PCT/US2013/040639, 10 pages.
Aurelio Bermudez, On the InfiniBand Subnet Discovery Process, IEEE the Computer Society 2003, pp. 1-6.
Tom Shanley, Infiniband Network Architecture, Pearson Education 2002, p. 559, 561.
Shanley, Tom, "Infiniband Network Architecture" (excerpt), Pearson Education, Copyright © 2002 by MindShare, Inc., published Oct. 2002, p. 204-209, 560-564.
European Patent Office, International Searching Authority, International Search Report and Written Opinion dated Sep. 12, 2012 for International Application No. PCT/US2012/040775, 13 pages.
Tom Shanley, Infiniband Network Architecture (excerpt), chapter—Detailed Description of the Link Layer, Pearson Education, published 2002, p. 390-392, 485, 491-493, 537-539.
Shanley, Tom, Infiniband Network Architecture (excerpt), Pearson Education, published 2002, p. 209-211, 393-394, 551, 554.
International Search Report dated Sep. 26, 2013 for Application No. PCT/US2013/040656, 10 pages.
InfiniBand[SM] Trade Association, InfiniBand™ Architecture Specification, vol. 1, Release 1.2.1, Nov. 2007, pp. 1-1727.
Shanley, Tom, "Infiniband Network Architecture", Pearson Education, Copyright © 2002 by MindShare, Inc., published Oct. 2002 p. 387-394.
Lee, M., Security Enhancement in Infiniband Architecture, IEEE, vol. 19, Apr. 2005, pp. 1-18.
Tom Shanley, "Infiniband Network Architecture", Copyright © 2002 by MindShare, Inc., ISBN: 0-321-11765-4, pp. 83-87, 95-102, 205-208, 403-406.
State Intellectual Property Office of the People's Republic of China, Search Report for Chinese Patent Application No. 201180039807.0, dated Jun. 3, 2015, 2 pages.
State Intellectual Property Office of the People's Republic of China, Search Report for Chinese Patent Application No. 201180040064.9, May 29, 2015, 1 page.
State Intellectual Property Office of the People's Republic of China dated May 5, 2015 for Chinese Patent Application No. 201180039850.7, 2 pages.
State Intellectual Property Office of the People's Republic of China, Search Report dated Sep. 9, 2015 for Chinese Patent Application No. 201280027279.1, 2 pages.
Tom Shanley, Infiniband Network Architecture (excerpt), Copyright © 2002 by MindShare, Inc., p. 213.
United States Patent and Trademark Office, Office Action dated Apr. 8, 2016 for U.S. Appl. No. 13/235,130, 32 pages.
United States Patent and Trademark Office, Office Action dated Apr. 8, 2016 for U.S. Appl. No. 13/235,161, 24 pages.
United States Patent and Trademark Office, Office Action dated May 6, 2016 for U.S. Appl. No. 13/488,192, 14 Pages.
United States Patent and Trademark Office, Office Action dated May 6, 2016 for U.S. Appl. No. 13/488,221, 16 Pages.
Shanley, Tom, "Infiniband Network Architecture" (Excerpt), Copyright 2002 by Mindshare, Inc., p. 86-87.
United States Patent and Trademark Office, Office Action dated Jun. 3, 2016 for U.S. Appl. No. 13/235,187, 22 pages.
United States Patent and Trademark Office, Office Action dated Apr. 18, 2017 for U.S. Appl. No. 13/235,113, 30 Pages.
Shanley, Tom, "Infiniband Network Architecture" (Excerpt), Copyright 2002 by Mindshare, Inc., pp. 8-9, 391-396, 549-551.
European Patent Office, Communication Pursuant to Article 94(3) EPC, dated Mar. 8, 2017 for European Patent Application No. 11767106.5, 10 Pages.
Ching-Min Lin et al., "A New Quorum-Based Scheme for Managing Replicated Data in Distributed Systems" IEEE Transactions on Computers, vol. 51, No. 12, Dec. 2002, 6 pages.
United States Patent and Trademark Office, Office Action Dated Nov. 16, 2017 for U.S. Appl. No. 13/235,113, 28 pages.
United States Patent and Trademark Office, Office Communication Dated Nov. 30, 2017 for U.S. Appl. No. 13/235,130, 3 pages.

* cited by examiner

SYSTEM AND METHOD FOR PROVIDING SOURCE ID SPOOF PROTECTION IN AN INFINIBAND (IB) NETWORK

CLAIM OF PRIORITY

This application claims the benefit of priority on U.S. Provisional Patent Application No. 61/493,330, entitled "STATEFUL SUBNET MANAGER FAILOVER IN A MIDDLEWARE MACHINE ENVIRONMENT" filed Jun. 3, 2011, which application is herein incorporated by reference.

CROSS-REFERENCED APPLICATIONS

The current application hereby incorporates by reference the material in the following patent applications:

U.S. patent application Ser. No. 13/487,973, entitled "SYSTEM AND METHOD FOR PROVIDING SECURE SUBNET MANAGER AGENT (SMA) IN AN INFINIBAND (IB) NETWORK", by inventors Bjorn Dag Johnsen, Ola Torudbakken and David Brean, filed Jun. 4, 2012.

U.S. patent application Ser. No. 13/488,040, entitled "SYSTEM AND METHOD FOR AUTHENTICATING IDENTITY OF DISCOVERED COMPONENT IN AN INFINIBAND (IB) NETWORK", by inventors Bjorn Dag Johnsen, Predrag Hodoba and Ola Torudbakken, filed Jun. 4, 2012.

U.S. patent application Ser. No. 13/488,088, entitled "SYSTEM AND METHOD FOR SUPPORTING CONSISTENT HANDLING OF INTERNAL ID SPACES FOR DIFFERENT PARTITIONS IN AN INFINIBAND (IB) NETWORK," by inventors Bjorn Dag Johnsen, Line Holen and David Brean filed Jun. 4, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting an InfiniBand (IB) network.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method that can provide source ID spoof protection in an InfiniBand (IB) fabric. The IB fabric can support a plurality of tenants in a subnet that connects a plurality of physical servers, wherein the plurality of tenants are associated with different partitions in the subnet. Then, the plurality of tenants can use at least one shared service, the IB fabric can be configured to determine what ID values are legal for different physical servers and different partitions.

DETAILED DESCRIPTION

Described herein is a system and method that can provide source ID spoof protection in an interconnected network, such as an InfiniBand (IB) network, or fabric.

Figure 1:
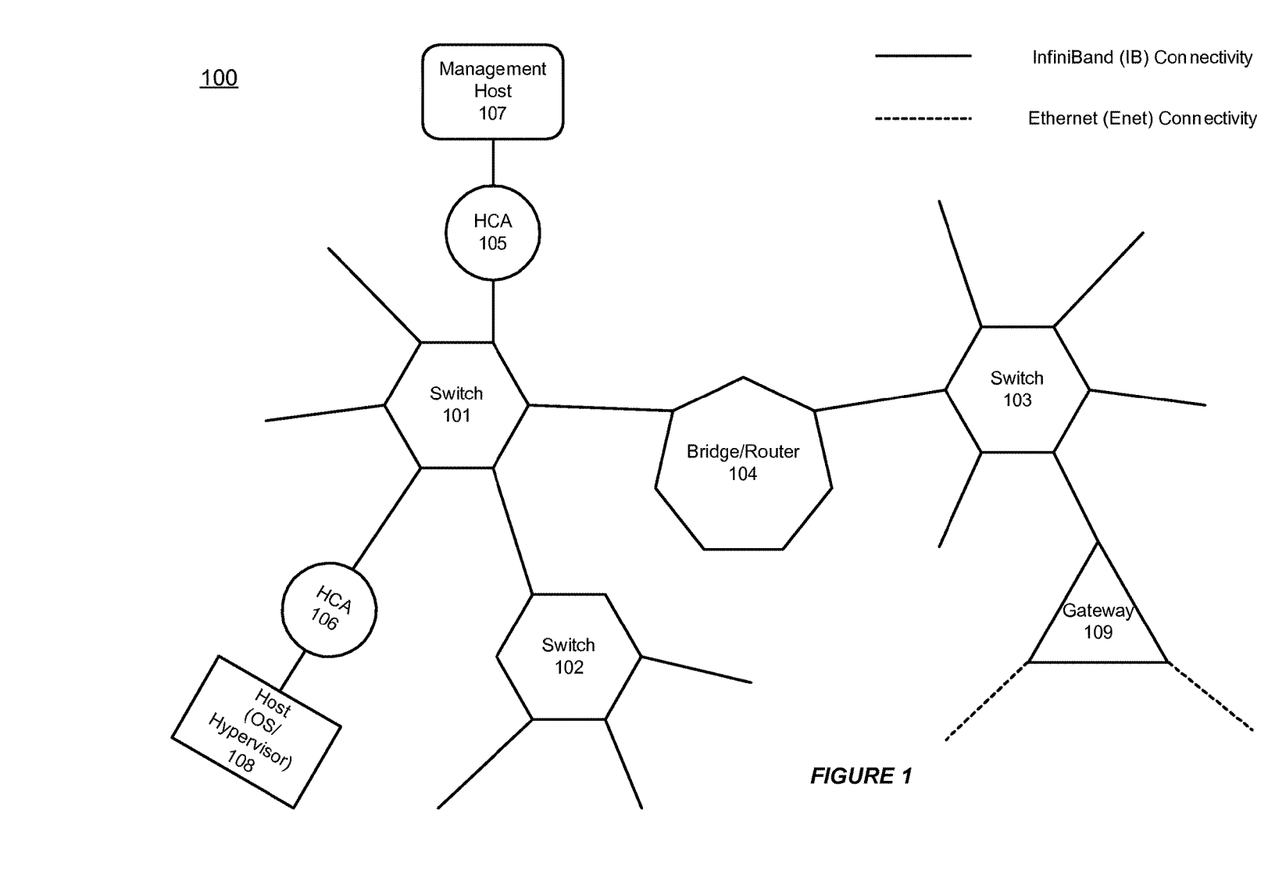
FIG. 1 shows an illustration of a fabric model in a middleware environment in accordance with an embodiment of the invention.

FIG. 1 shows an illustration of a fabric model in a middleware environment in accordance with an embodiment of the invention. As shown in FIG. 1, an interconnected network, or a fabric 100, can include switches 101-103, bridges and routers 104, host channel adapters (HCAs) 105-106 and designated management hosts 107. Additionally, the fabric can include, or be connected to, one or more hosts 108 that are not designated management hosts.

The designated management hosts 107 can be installed with HCAs 105, 106, a network software stack and relevant management software in order to perform network management tasks. Furthermore, firmware and management software can be deployed on the switches 101-103, and the bridges and routers 104 to direct traffic flow in the fabric. Here, the host HCA drivers, OS and Hypervisors on hosts 108 that are not designated management hosts may be considered outside the scope of the fabric from a management perspective.

The fabric 100 can be in a single media type, e.g. an IB only fabric, and be fully connected. The physical connectivity in the fabric ensures in-band connectivity between any fabric components in the non-degraded scenarios. Alternatively, the fabric can be configured to include Ethernet (Enet) connectivity outside gateway (GW) external ports on a gateway 109. Additionally, it is also possible to have independent fabrics operating in parallel as part of a larger system. For example, the different fabrics can only be indirectly connected via different HCAs or HCA ports.

InfiniBand (IB) Architecture

IB architecture is a serial point-to-point technology. Each of the IB networks, or subnets, can include a set of hosts interconnected using switches and point-to-point links. A single subnet can be scalable to more than ten-thousand nodes and two or more subnets can be interconnected using an IB router. The hosts and switches within a subnet are addressed using local identifiers (LIDs), e.g. a single subnet may be limited to 49151 unicast addresses.

An IB subnet can employ at least one subnet manager (SM) which is responsible for initializing and starting up the sub-net including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

At the time of initialization, the SM starts in the discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (e.g. a trap) can be forwarded to the SM and the SM can reconfigure the network. Part of the reconfiguration process, or a heavy sweep process, is the rerouting of the network which can be performed in order to guarantee full connectivity, deadlock freedom, and proper load balancing between all source and destination pairs.

The HCAs in an IB network can communicate with each other using queue pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, a Send Queue (SQ) and a Receive Queue (RQ). There is one such pair present at each end-node that is participating in the communication. The send queue holds work requests to be transferred to the remote node, while the receive queue holds information on what to do with the data received from the remote node. In addition to the QPs, each HCA can have one or more Completion Queues (CQs) that are associated with a set of send and receive queues. The CQ holds completion notifications for the work requests posted to the send and receive queue.

The IB architecture is a flexible architecture. Configuring and maintaining an IB subnet can be carried out via special in-band subnet management packets (SMPs). The functionalities of a SM can, in principle, be implemented from any node in the IB subnet. Each end-port in the IB subnet can have an associated subnet management agent (SMA) that is responsible for handling SMP based request packets that are directed to it. In the IB architecture, a same port can represent a SM instance or other software component that uses SMP based communication. Thus, only a well defined sub-set of SMP operations can be handled by the SMA.

SMPs use dedicated packet buffer resources in the fabric, e.g. a special virtual lane (VL15) that is not flow-controlled (i.e. SMP packets may be dropped in the case of buffer overflow. Also, SMPs can use either the routing that the SM sets up based on end-port Local Identifiers (LIDs), or SMPs can use direct routes where the route is fully defined by the sender and embedded in the packet. Using direct routes, the packet's path goes through the fabric in terms of an ordered sequence of port numbers on HCAs and switches.

The SM can monitor the network for changes using SMAs that are presented in every switch and/or every HCA. The SMAs communicate changes, such as new connections, disconnections, and port state change, to the SM using traps and notices. A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

The subnet administrator (SA) is a subnet database associated with the master SM to store different information about a subnet. The communication with the SA can help the end-node to establish a QP by sending a general service management datagram (MAD) through a designated QP, e.g. QP1. Both sender and receiver require information such as source/destination LIDs, service level (SL), maximum transmission unit (MTU), etc. to establish communication via a QP. This information can be retrieved from a data structure known as a path record that is provided by the SA. In order to obtain a path record, the end-node can perform a path record query to the SA, e.g. using the SubnAdmGet/SubnAdmGetable operation. Then, the SA can return the requested path records to the end-node.

The IB architecture provides partitions as a way to define which IB end-ports should be allowed to communicate with other IB end-ports. Partitioning is defined for all non-SMP packets on the IB fabric. The use of partitions other than the default partition is optional. The partition of a packet can be defined by a 16 bit P_Key that consists of a 15 bit partition number and a single bit member type (full or limited).

The partition membership of a host port, or an HCA port, can be based on the premise that the SM sets up the P_Key table of the port with P_Key values that corresponds to the current partition membership policy for that host. In order to compensate for the possibility that the host may not be fully trusted, the IB architecture also defines that switch ports can optionally be set up to do partition enforcement. Hence, the P_Key tables of switch ports that connect to host ports can then be set up to reflect the same partitions as the host port is supposed to be a member of (i.e. in essence equivalent to switch enforced VLAN control in Ethernet LANs).

Since the IB architecture allows full in-band configuration and maintenance of an IB subnet via SMPs, the SMPs themselves are not subject to any partition membership restrictions. Thus, in order to avoid the possibility that any rough or compromised node on the IB fabric is able to define an arbitrary fabric configuration (including partition membership), other protection mechanisms are needed.

M_Keys can be used as the basic protection/security mechanism in the IB architecture for SMP access. An M_Key is a 64 bit value that can be associated individually with each individual node in the IB subnet, and where incoming SMP operations may be accepted or rejected by the target node depending on whether the SMP includes the correct M_Key value (i.e. unlike P_Keys, the ability to specify the correct M_Key value—like a password—represents the access control).

By using an out-of-band method for defining M_Keys associated with switches, it is possible to ensure that no host node is able to set up any switch configuration, including partition membership for the local switch port. Thus, an M_Key value is defined when the switch IB links becomes operational. Hence, as long as the M_Key value is not compromised or "guessed" and the switch out-of-band access is secure and restricted to authorized fabric administrators, the fabric is secure.

Furthermore, the M_Key enforcement policy can be set up to allow read-only SMP access for all local state information except the current M_Key value. Thus, it is possible to protect the switch based fabric from un-authorized (re-)configuration, and still allow host based tools to perform discovery and diagnostic operations.

The flexibility provided by the IB architecture allows the administrators of IB fabrics/subnets, e.g. HPC clusters, to decide whether to use embedded SM instances on one or more switches in the fabric and/or set up one or more hosts on the IB fabric to perform the SM function. Also, since the wire protocol defined by the SMPs used by the SMs is available through APIs, different tools and commands can be implemented based on use of such SMPs for discovery, diagnostics and are controlled independently of any current Subnet Manager operation.

From a security perspective, the flexibility of IB architecture indicates that there is no fundamental difference between root access to the various hosts connected to the IB fabric and the root access allowing access to the IB fabric configuration. This is fine for systems that are physically secure and stable. However, this can be problematic for system configurations where different hosts on the IB fabric are controlled by different system administrators, and where such hosts should be logically isolated from each other on the IB fabric.

Providing Source ID Spoof Protection in an InfiniBand (IB) Fabric

Figure 2:
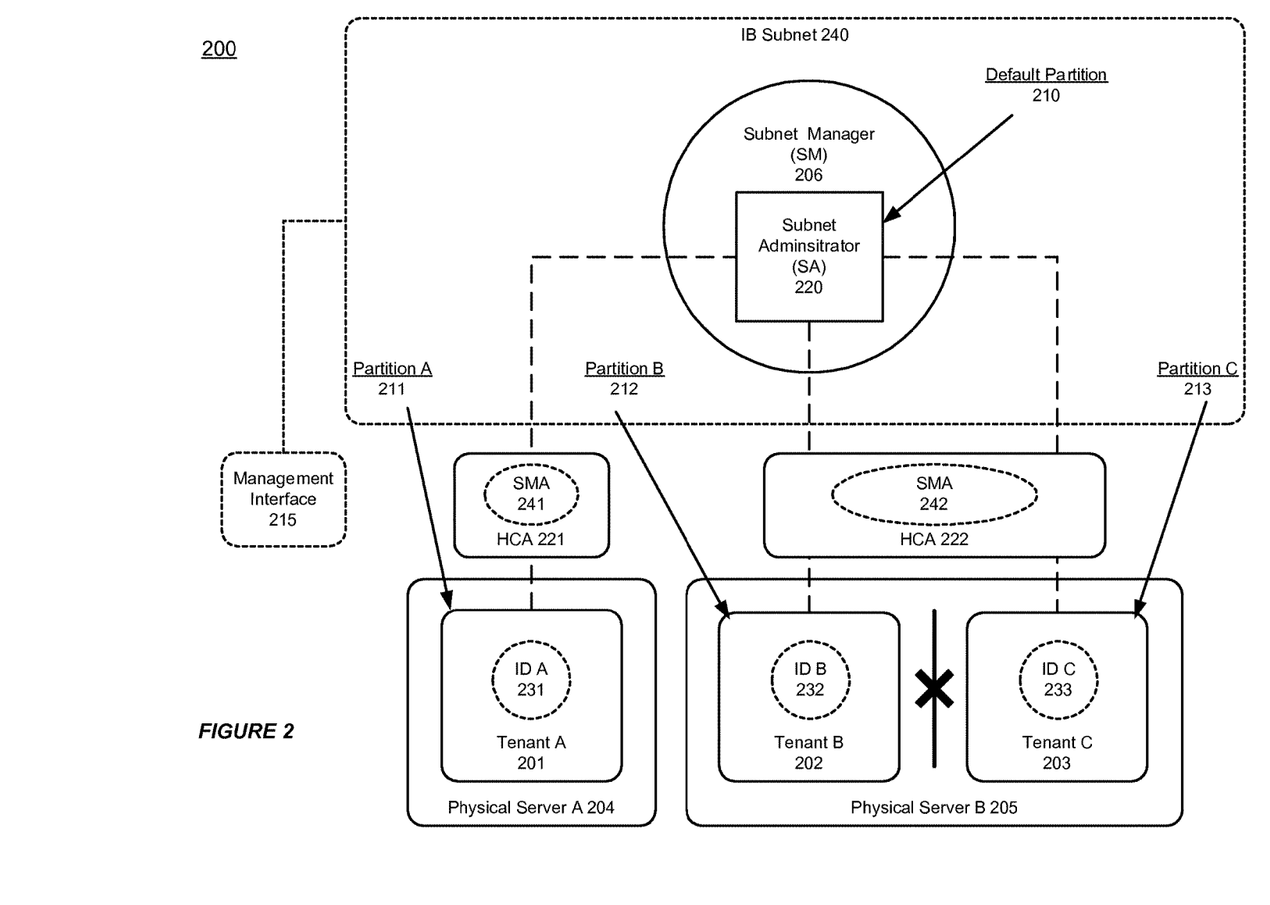
FIG. 2 shows an illustration of providing source ID spoof protection in an IB fabric in accordance with an embodiment of the invention.

FIG. 2 shows an illustration of providing source ID spoof protection in an IB fabric in accordance with an embodiment of the invention. As shown in FIG. 2, a subnet 240 in an IB fabric 200 can support a plurality of tenants, e.g. tenants A-C 201-203. The different tenants can reside on a plurality of physical servers, e.g. the physical servers A-B 204-205, which can be connected to the IB subnet 240 via different HCAs 221-222.

The IB subnet 240 can include a plurality of partitions, e.g. partitions A-C 211-213, each of which can be associated with the one or more tenants. For example, tenant A 201 is associated with partition A 211, tenant B 202 is associated with partition B 212, and tenant C 203 is associated with partition C 213.

Additionally, the IB subnet 240 can support one or more shared partitions, within which shared services are full members and clients from one or more tenants are limited members. For example, the IB subnet 240 can include a default partition 210 that allows for sharing limited membership among different tenants 201-203 in order to access a SA 220 in the subnet 240 (i.e. the default partition 210 can be used exclusively for SA 220 access). The default partition 210, which is a shared partition, can provide clients in different partitions with access to the SA instance 220.

In accordance with an embodiment of the invention, the SM 206 can rely on the basic hardware GUID of the relevant IB ports that are based on secure HCA instances 221-222 with trusted and/or authenticated SMA implementations. The secure HCA implementations also ensures that source LIDs and source GUIDs, which are included in the IB packet headers sent from the HCA, can include a value that is in correspondence with what the SM 206 has retrieved from or set up for the corresponding SMA 241-242 and HCA port. Thus, the source IDs used in packet headers from the HCA 221-222 is guaranteed to be consistent with what the SM 206 expects.

Additionally, the hardware controlled IB packet headers may be available to a receiving entity (e.g. in the case of an unreliable datagram packet, which includes communication management datagrams that are used for establishing reliable connection type communication). The receiving entity can correlate the information in the received payload with the source information in the packet headers. Furthermore, the receiving entity can check with the SA branch of the SM to determine whether any payload based source ID is legal for the relevant source port.

Figure 4:
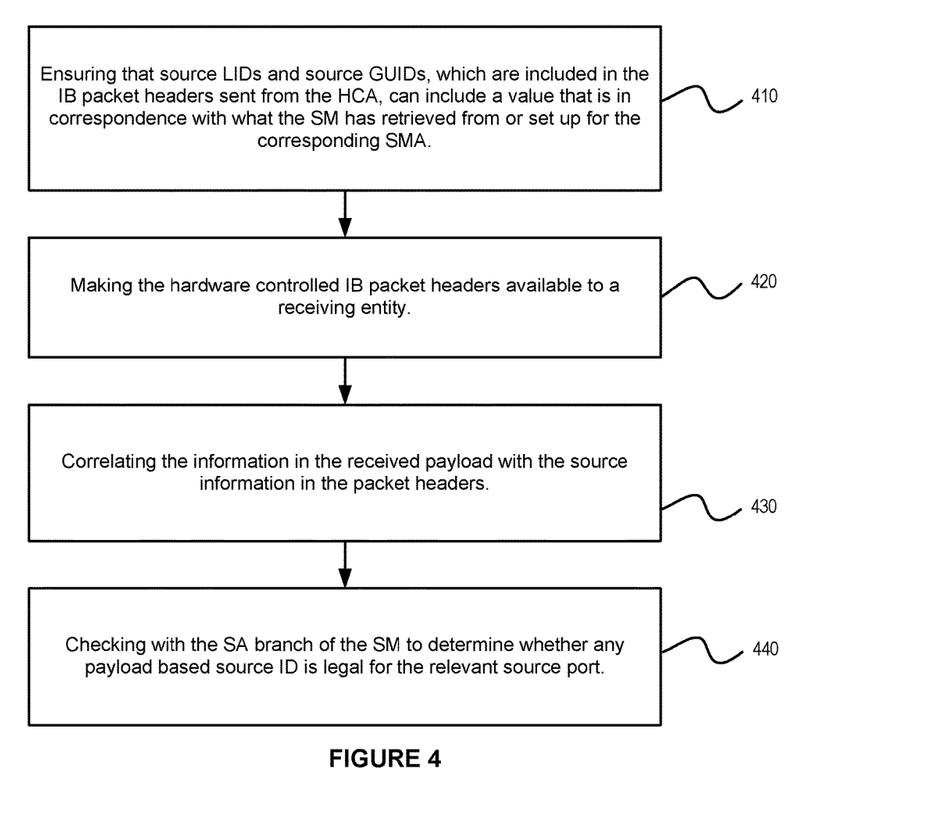
FIG. 4 shows a flow chart for correlating information in a received payload with source information in a packet header.

FIG. 4 shows a flow chart for correlating information in a received payload with source information in a packet header. At step 410, it is ensured that source LIDs and source GUIDs, which are included in the IB packet headers sent from the HCA, can include a value that is in correspondence with what the SM has retrieved from or set up for the corresponding SMA. At step 420, the hardware controlled IB packet headers is made available to a receiving entity. At step 430, The information in the received payload is correlated with the source information in the packet headers. At step 440, the SA branch of the SM is checked to determine whether any payload based source ID is legal for the relevant source port.

Furthermore, the SM 206/SA 220 can keep track of a list of multicast group IDs (MCGIDs) that are associated with specific partitions. Also, the SM/SA may require that any client defined multicast group to include a bit field that represents the relevant partition number, e.g. in a manner similar to what is defined for the default broadcast group in Internet Protocol over Infiniband (IPoIB). Thus, the SM/SA can ensure that relevant multicast group IDs may only be created for the relevant partitions and also by clients that are legal members of the relevant partitions.

The SM 206/SA 220 may also have policy that restricts client creation of certain multicast groups in different partitions. This can include well known multicast groups with special semantics, e.g. in a manner similar to how the default broadcast group defines to what extent an IPoIB link exists in a partition. Thus, the SM 206/SA 220 can ensure that unintended communication types are not enabled in a partition.

Furthermore, by allowing the scope of different GUIDs to be only defined for specific sets of partitions and/or specific sets of physical nodes in the IB fabric, e.g. in accordance with policy input via a designated management interface to the SM/SA, the SM/SA can ensure that such IDs may only be used to represent the correct physical and logical communication end-points without any interference from unrelated communication using the same GUIDs.

Additionally, the communication for each tenant can be contained within a corresponding sub-set of the complete fabric topology, which can include the corresponding storage and external network resources. Furthermore, if shared services are used between the tenants, then separate fabric buffer resources (VLs) can be used for this communication in order to avoid impact on the tenant/system internal traffic.

For more complex topologies as well as more complex communication patterns between different components and sub-systems/sub-topologies, other advanced methods for handling allocation and adjustment of bandwidth can be implemented. These advanced methods can include both static and dynamic routing, static and dynamic SL/VL usage, as well as dynamic monitoring and handling of congestion conditions.

As shown in FIG. 2, a single active SM/SA instance 220 can provide the SA access service via a single port. The SA access service can represent a single shared service in the subnet 240 for all hosts independently of which system/tenant the hosts belong to. The SA can be implemented to handle the "brute force" shutdown of host HCA ports that may greatly limit the SA request processing capacity. Also, the SA can be implemented to be based on enhanced flow-control that involves cooperation between well behaved clients and the SA.

From a security perspective, the fabric 200 does not rely on well-behaved clients. The fabric 200 can be implemented to address both the fine grained Denial of Service (DoS) prevention and reasonable QOS/SLAs for a large number of concurrent clients. Additionally, the SM/SA infrastructure can be designed for dealing with multiple IB subnets in the same physical fabric.

The switch based IB security scheme, e.g. for M_Key protection and switch based partition enforcement, may depend on whether the IB fabric 200 and the associated cabling are physically secure and are stable. Like conventional Ethernet VLAN enforcement schemes, a node that is plugged into a switch port can exercise the partition membership that is defined for that switch port, independently of whether this membership was intended for another node instance. Thus, any policy information that depends on the identity of a node, rather than the physical connectivity, may not be correctly enforced in the presence of cabling mistakes or ID spoofing by the host node.

In order to address this issue, a management entity, e.g. SM 206, can use a robust scheme that uses public key/private key protocols to perform an explicit authentication of a remote SMA instance, e.g. SMA 241. This authentication step can avoid exposing any private credentials, e.g. M_Key, to the remote entity, which may turn out to be non-trustworthy.

Figure 3:
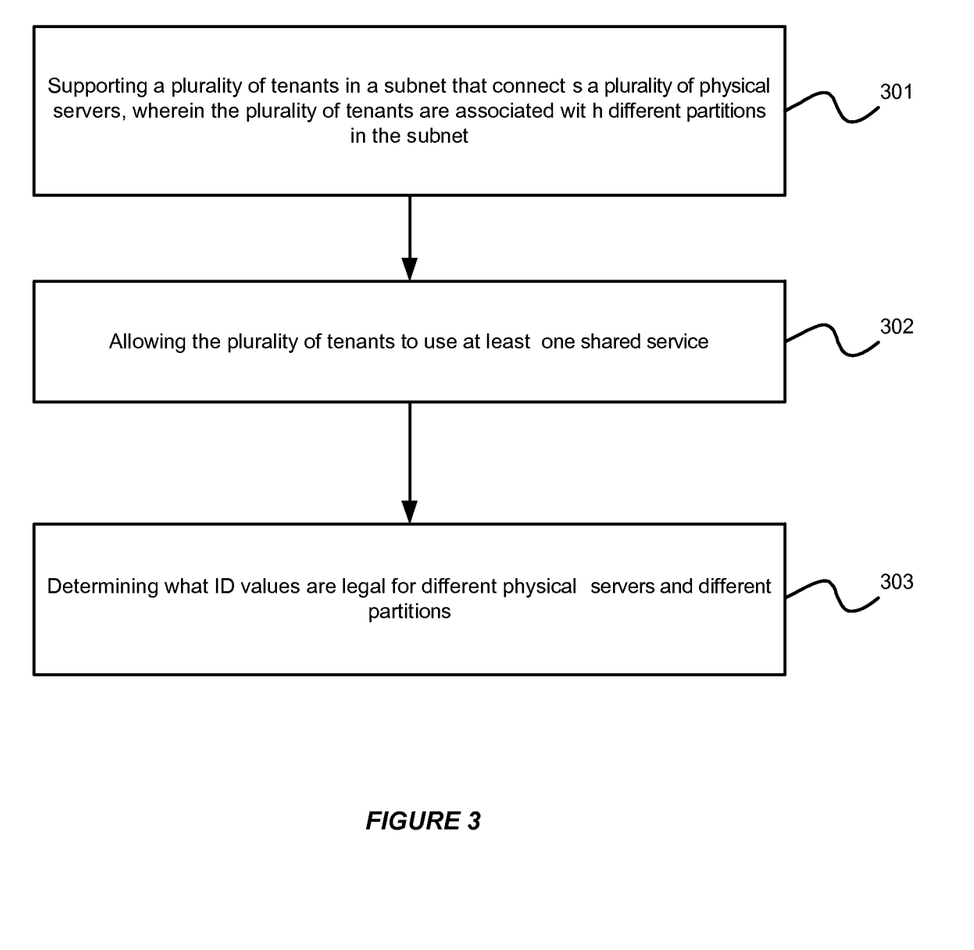
FIG. 3 illustrates an exemplary flow chart for providing source ID spoof protection in an IB fabric in accordance with an embodiment of the invention.

FIG. 3 illustrates an exemplary flow chart for providing source ID spoof protection in an IB fabric in accordance with an embodiment of the invention. As shown in FIG. 3, at step 301, a plurality of tenants can be supported in a subnet that connects a plurality of physical servers, wherein the plurality of tenants are associated with different partitions in the subnet. Then, at step 302, the plurality of tenants can use at least one shared service. Finally, at step 303, the IB fabric can be configured to determine what ID values are legal for different physical servers and different partitions.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for providing source ID spoof protection in an InfiniBand (IB) fabric of a computer system comprising a subnet including a plurality of physical host servers each associated with a host channel adapter (HCA), and a plurality of tenants executing on the physical servers, wherein each HCA provides a port to the subnet, each port having a hardware globally unique identifier (GUID), and wherein each tenant is provided access to the subnet via the provided port of the HCA associated with the server that each tenant executes on, the method comprising:

provide a subnet manager (SM) that is responsible for initializing the subnet and configuring each port of each HCA included in the subnet;

assigning, by the subnet manager, a local identifier (LID) to each port of each HCA in the subnet;

including, by each HCA, the GUID and the LID of each HCA in the packet header of each packet sent by each HCA;

including a payload based source ID in the payload of each packet sent by each HCA;

providing a trusted secure subnet management agent (SMA) operating on each HCA;

providing a subnet administrator (SA) in the IB fabric, wherein the subnet administrator comprises a subnet database that stores information about the subnet, and wherein the SA is a shared service in the subnet;

providing a default partition that is a shared partition, wherein each tenant of the subnet is a member of the default partition and wherein each tenant, and clients thereof, have access to shared services of the subnet that are full members of the default partition;

making the SA shared service a full member of the default partition, thereby giving each tenant access to the SA shared service;

performing, by an entity receiving each of said communication packets over the IB fabric, a correlation of the payload based source ID in each received packet sent by each HCA with the GUID and LID source information in the packet header of each received packet sent by each HCA;

checking, with the SA shared service, and by the entity receiving each of said communication packets over the IB fabric, that the payload based source ID is legal for the port of the HCA that sent each received packet.

2. The method according to claim 1, further comprising: providing a management interface, wherein the management interface is used to specify which identifiers are legal for which physical host channel adaptor ports and/or partitions.

3. The method according to claim 1, further comprising: receiving an IB request packet verifying that the payload based source ID included in a corresponding packet payload is permitted for a sender based on hardware enforced source information in the IB packet header.

4. The method according to claim 1, further comprising: using a public key/private key protocol to provide explicit authentication of a trusted subnet management agent (SMA) instance.

5. The method of claim 1, further comprising: keeping track, by the subnet manager, of a list of multicast group IDs that are associated with specific partitions.

6. The method of claim 5, further comprising: requiring, by the subnet manager, that any client defined multicast group ID include a bit field that represents the relative partition number of the partition with which a given multicast group ID is associated with.

7. The method of claim 5, further comprising: assigning a unique ID to each tenant in the subnet.

8. A non-transitory machine readable storage medium comprising instructions stored thereon for providing source ID spoof protection in an InfiniBand (IB) fabric of a computer system comprising a subnet including a plurality of physical host servers each associated with a host channel adapter (HCA), and a plurality of tenants executing on the physical servers, wherein each HCA provides a port to the subnet, each port having a hardware globally unique identifier (GUID), and wherein each tenant is provided access to the subnet via the provided port of the HCA associated with the server that each tenant executes on, which instructions, when executed, cause the computer system to perform steps comprising:
providing a subnet manager (SM) that is responsible for initializing the subnet and configuring each port of each HCA included in the subnet;
assigning, by the subnet manager, a local identifier (LID) to each port of each HCA in the subnet;
including, by each HCA, the GUID and the LID of each HCA in the packet header of each packet sent by each HCA;
including a payload based source ID in the payload of each packet sent by each HCA;
assigning an unique ID to each tenant included in the subnet;
providing a trusted secure subnet management agent (SMA) operating on each HCA;
providing a subnet administrator (SA) in the IB fabric, wherein the subnet administrator comprises a subnet database that stores information about the subnet, and wherein the SA is a shared service in the subnet;
providing a default partition that is a shared partition, wherein each tenant of the subnet is a member of the default partition and wherein each tenant, and clients thereof, have access to shared services of the subnet that are full members of the default partition;
making the SA shared service a full member of the default partition, thereby giving each tenant access to the SA shared service;
performing, by an entity receiving each of said communication packets over the IB fabric, a correlation of the payload based source ID in each received packet sent by each HCA with the GUID and LID source information in the packet header of each received packet sent by each HCA;
checking, with the SA shared service, and by the entity receiving each of said communication packets over the IB fabric, that the payload based source ID is legal for the port of the HCA that sent each received packet.

9. A system for providing source ID spoof protection in an InfiniBand (IB) fabric, comprising:
a subnet, including a plurality of physical host servers each having one or more microprocessors, wherein each physical host server is associated with a host channel adapter (HCA) that operates as part of the IB fabric, wherein each host channel adaptor provides a port in the subnet, each port having a hardware globally unique identifier (GUID), and wherein each host channel adaptor is associated with a trusted secure subnet management agent (SMA);
a plurality of tenants executing on the physical servers, wherein each tenant is provided access to the subnet via the provided port of the HCA associated with the server that each tenant executes on;
a subnet manager (SM) that is responsible for initializing the subnet and configuring each port of each HCA included in the subnet, wherein the subnet manager assigns a local identifier (LID) to each port of each HCA in the subnet;
wherein each HCA is configured to include the GUID and the LID of each HCA in the packet header of each packet sent by each HCA and a payload based source ID in the payload of each packet sent by each HCA;
a subnet administrator (SA) in the IB fabric, wherein the subnet administrator comprises a subnet database that stores information about the subnet, and wherein the SA is a shared service in the subnet;
a default partition that is a shared partition, wherein each tenant of the subnet is a member of the default partition and wherein each tenant, and clients thereof, have access to shared services of the subnet that are full members of the default partition, and wherein the SA shared service is a full member of the default partition, thereby giving each tenant access to the SA shared service;
wherein an entity receiving each of said communication packets over the IB fabric is configured to perform a correlation of the payload based source ID in each received packet sent by each HCA with the GUID and LID source information in the packet header of each received packet sent by each HCA; and
wherein the entity receiving each of said communication packets over the IB fabric is further configured to check with the SA shared service that the payload based source ID is legal for the port of the HCA that sent each received packet.

10. The system according to claim 9, further comprising a management interface, wherein the management interface is used to specify which identifiers are permitted for which physical host channel adaptor ports and/or partitions.

11. The system according to claim 9, wherein: the subnet manager (SM) receives an IB request packet verifying that the payload based source ID included in a corresponding packet payload is legal for a sender based on hardware enforced source information in the IB packet header.

12. The system according to claim 9, wherein a public key/private key protocol is used to provide explicit authentication of a trusted subnet management agent (SMA) instance.

13. The system of claim 9, wherein the subnet manager keeps track of a list of multicast group IDs that are associated with specific partitions.

14. The system of claim 9, wherein the subnet manager requires that any client defined multicast group ID include a bit field that represents the relative partition number of the partition with which a given multicast group ID is associated with.

15. The system of claim 9, wherein a unique ID is assigned to each tenant in the subnet.

\* \* \* \* \*